United States Patent
Farrell

(10) Patent No.: US 8,678,753 B2
(45) Date of Patent: Mar. 25, 2014

(54) PASSIVE FLOW CONTROL THROUGH TURBINE ENGINE

(75) Inventor: Kevin Farrell, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 1117 days.

(21) Appl. No.: 12/627,007

(22) Filed: Nov. 30, 2009

(65) Prior Publication Data

US 2011/0129330 A1   Jun. 2, 2011

(51) Int. Cl.
*F01D 25/24* (2006.01)

(52) U.S. Cl.
USPC ............................................ 415/126; 60/771

(58) Field of Classification Search
USPC ..................... 415/126; 60/770, 771
See application file for complete search history.

(56) References Cited

U.S. PATENT DOCUMENTS

| | | | |
|---|---|---|---|
| 3,038,698 A | 6/1962 | Troyer | |
| 3,042,371 A | 7/1962 | Fanti | |
| 4,007,780 A | 2/1977 | Caldwell et al. | |
| 4,619,580 A | 10/1986 | Snyder | |
| 4,730,982 A | 3/1988 | Kervistin | |
| 4,752,182 A | 6/1988 | Zaehring et al. | |
| 4,808,246 A * | 2/1989 | Albrecht et al. | ............... 148/527 |
| 5,207,558 A | 5/1993 | Hagle et al. | |
| 5,253,701 A | 10/1993 | Leidinger | |
| 6,485,255 B1 | 11/2002 | Care et al. | |
| 7,114,920 B2 | 10/2006 | Synnott | |
| 7,118,322 B2 | 10/2006 | Mortgat | |
| 7,178,338 B2 | 2/2007 | Whurr | |
| 7,334,985 B2 | 2/2008 | Lutjen et al. | |
| 2002/0125340 A1 * | 9/2002 | Birch et al. | ............... 239/265.11 |
| 2005/0229586 A1 | 10/2005 | Whurr | |

FOREIGN PATENT DOCUMENTS

GB           2022710 A      12/1979

* cited by examiner

*Primary Examiner* — Dwayne J White
(74) *Attorney, Agent, or Firm* — Krieg DeVault LLP

(57) ABSTRACT

An apparatus for controlling a fluid flow is disclosed herein. The apparatus includes first and second spaced walls defining opposite sides of a first fluid passageway extending along a first axis. At least one of the first and second walls is cantilevered along the first axis and includes a distal end moveable relative to the first axis. The distal end of the at least one wall is moveable in response to changes in the flow temperature to passively vary a size of the first fluid passageway.

17 Claims, 4 Drawing Sheets

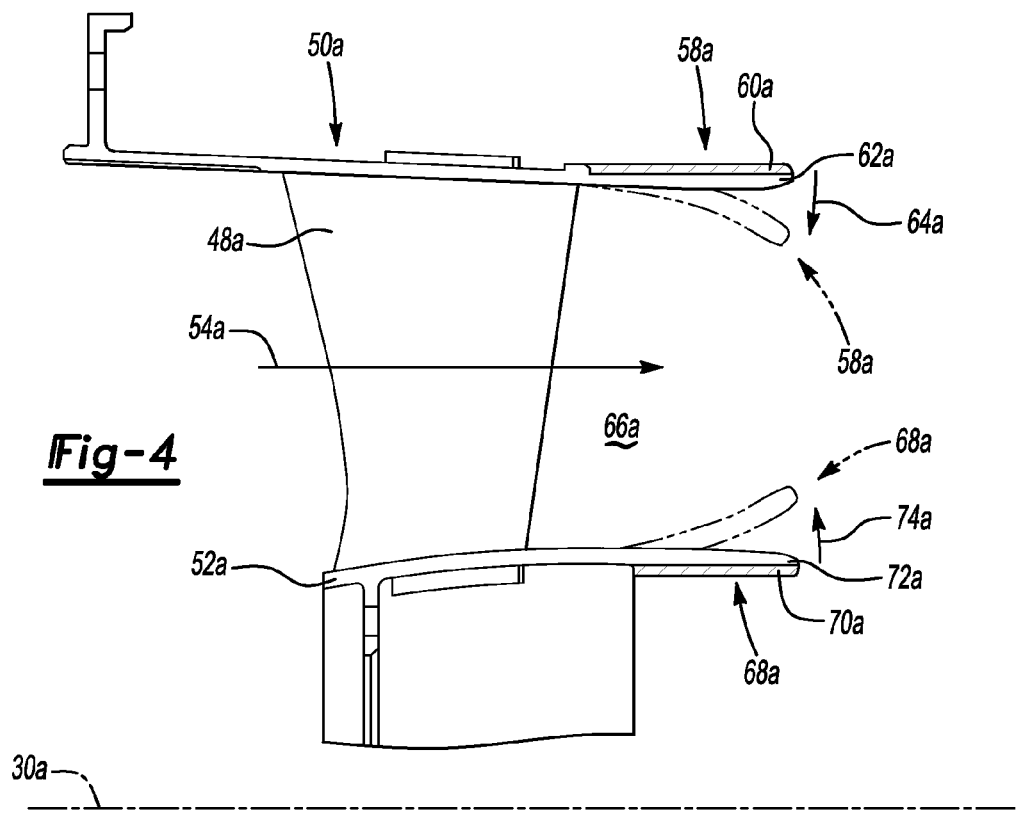
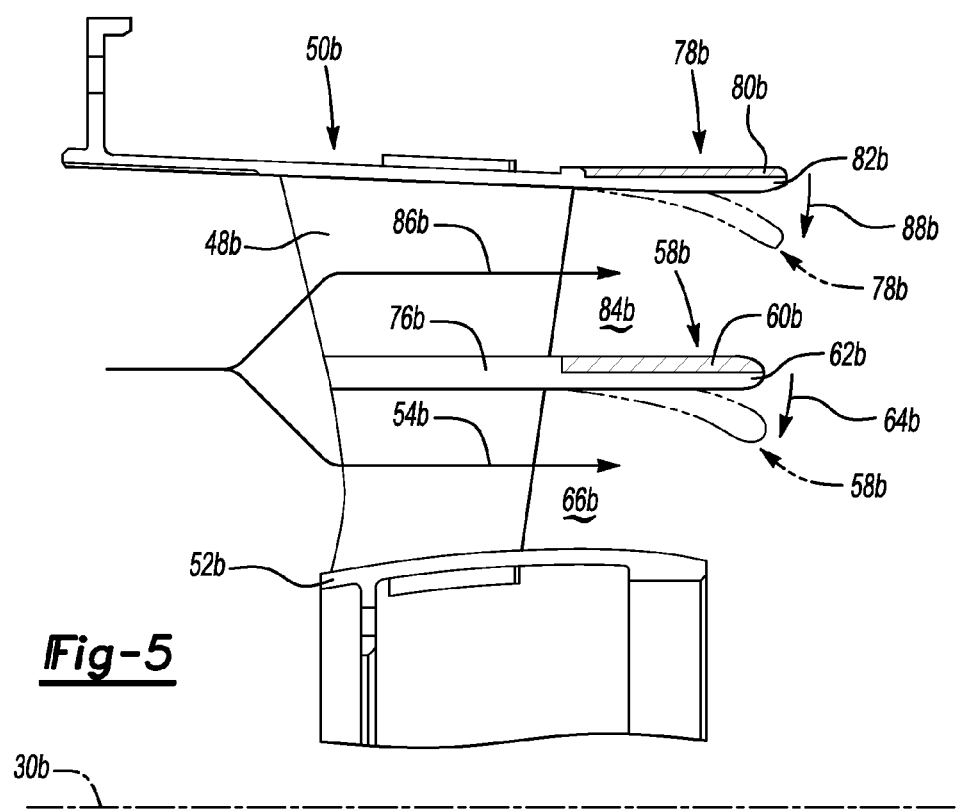

US 8,678,753 B2

PASSIVE FLOW CONTROL THROUGH TURBINE ENGINE

BACKGROUND OF THE INVENTION

1. Field of the Invention

This invention relates to a turbine engine and more particularly to a fluid passageway that may be applied in a turbine engine.

2. Description of Related Prior Art

U.S. Pat. No. 3,038,698 discloses a mechanism for controlling gaseous flow in a turbine engine. The apparatus for obtaining this control consists generally of vanes, blading, or nozzle enclosures for turbo-machinery wherein one or more portions or sections of the element is fabricated of two or more metallic substances having different coefficients of linear expansion and bonded or otherwise held in intimate contact or wherein the element is fabricated of two or more metallic substances having different coefficients of thermal expansion and welded or otherwise restrained in such a manner as to cause a change in shape in the element with changes in temperature.

U.S. Pat. No. 6,485,255 discloses a cooling air flow control device for a gas turbine engine. The air flow control device comprises a component, a cooling passage defined within the component and a shaped memory metal valve. The shaped memory metal valve is disposed in the cooling passage to regulate, in use, the flow rate of a cooling air flow supplied, in operation, through the cooling passage wherein the shaped memory metal valve operates by changing shape to control the flow rate of the cooling air flow in response to the temperature of the component.

SUMMARY OF THE INVENTION

In summary, the invention is an apparatus for controlling a fluid flow. The apparatus includes first and second spaced walls defining opposite sides of a first fluid passageway extending along a first axis. At least one of the first and second walls is cantilevered along the first axis and includes a distal end moveable relative to the first axis. The distal end of the at least one wall is moveable in response to changes in the flow temperature to passively vary a size of the first fluid passageway.

BRIEF DESCRIPTION OF THE DRAWINGS

Advantages of the present invention will be readily appreciated as the same becomes better understood by reference to the following detailed description when considered in connection with the accompanying drawings wherein:

FIG. 4 is a cross-sectional detail view analogous to the view in FIG. 2 but of a second exemplary embodiment of the invention;

FIG. 5 is a cross-sectional detail view analogous to the view in FIG. 2 but of a third exemplary embodiment of the invention;

DETAILED DESCRIPTION OF THE EXEMPLARY EMBODIMENTS

Figure 1:
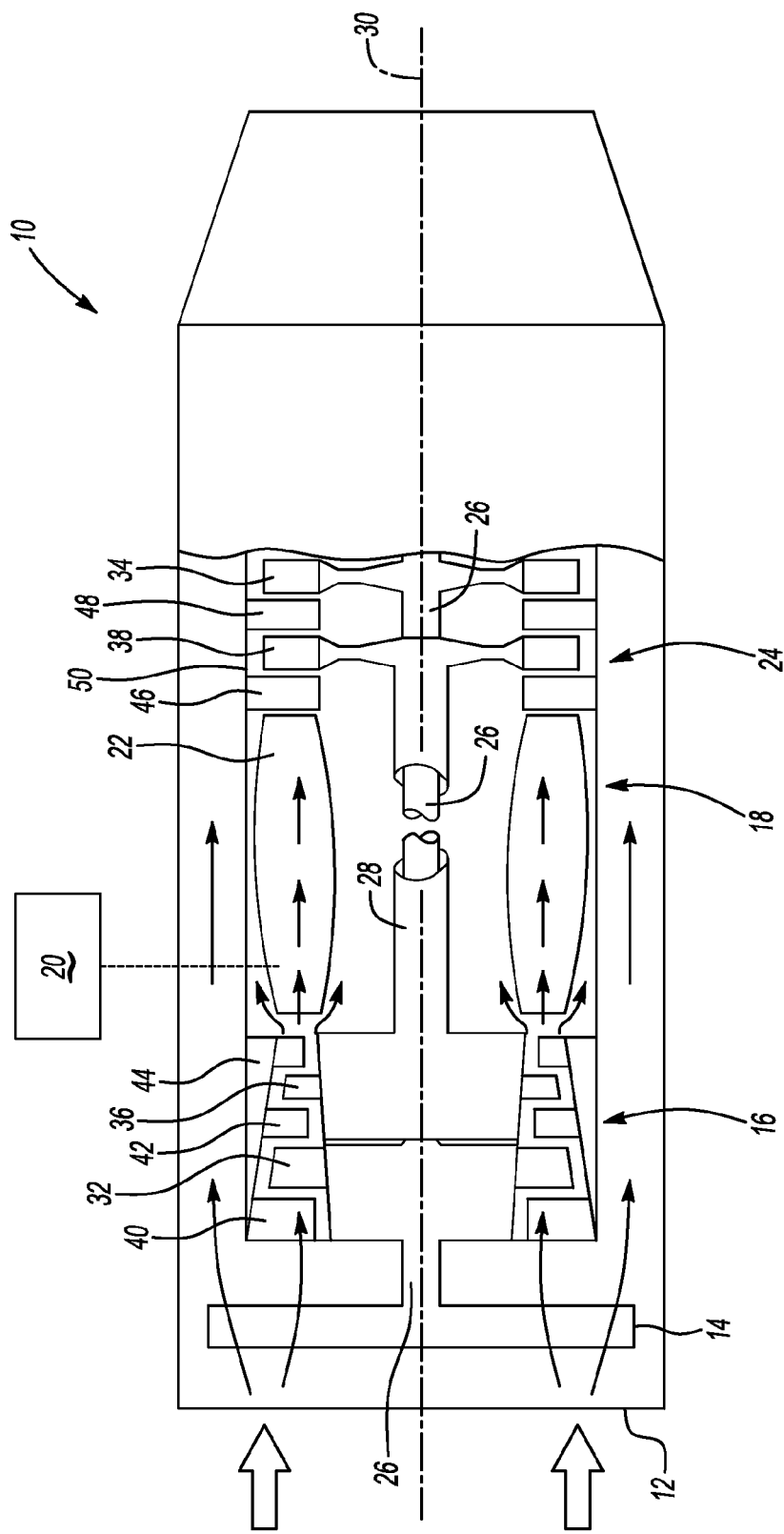
FIG. 1 is a schematic view of a turbine engine that incorporates an exemplary embodiment of the invention.

A plurality of different embodiments of the invention is shown in the Figures of the application. Similar features are shown in the various embodiments of the invention. Similar features have been numbered with a common reference numeral and have been differentiated by an alphabetic suffix. Also, to enhance consistency, the structures in any particular drawing share the same alphabetic suffix even if a particular feature is shown in less than all embodiments. Similar features are structured similarly, operate similarly, and/or have the same function unless otherwise indicated by the drawings or this specification. Furthermore, particular features of one embodiment can replace corresponding features in another embodiment or can supplement other embodiments unless otherwise indicated by the drawings or this specification.

The invention, as exemplified in the embodiments described below, can passively control the flow of fluid in a turbine engine in response to changes in the flow temperature. In addition, embodiments of the invention can be practiced in operating environments other than turbine engines. Controlling the flow of fluids in a turbine engine can be desirable to improve efficiencies by varying the mass flow of the primary or core fluid stream in view of the operating conditions of the engine. For example, by changing the characteristics of fluid flow, the compressor or operating map can be changed. Other reasons for modifying the core flow of fluid through a turbine engine, by way of example and not limitation, is to variably divert fluid away from core flow to secondary flow paths for cooling. By modifying the flow passively, the embodiments described below can reduce the cost and complexity of turbine engines. It is noted that embodiments of the invention can be practiced in turbine engines to control passageways for flow other than core flow.

FIG. 1 schematically shows a turbine engine 10. The various unnumbered arrows represent the flow of fluid through the turbine engine 10. The turbine engine 10 can produce power for several different kinds of applications, including vehicle propulsion and power generation, among others. The first exemplary embodiment of the invention can be practiced in any configuration of turbine engine and for any application.

The exemplary turbine engine 10 can include an inlet 12 with a fan 14 to receive fluid such as air. Alternative embodiments of the invention may not include a fan. The turbine engine 10 can also include a compressor section 16 to receive the fluid from the inlet 12 and compress the fluid. The turbine engine 10 can also include a combustor section 18 to receive the compressed fluid from the compressor section 16. The compressed fluid can be mixed with fuel from a fuel system 20 and ignited in a combustion chamber 22 defined by the combustor section 18. The turbine engine 10 can also include a turbine section 24 to receive the combustion gases from the combustor section 18. The energy associated with the combustion gases can be converted into kinetic energy (motion) in the turbine section 24.

In FIG. 1, shafts 26, 28 are shown disposed for rotation about a centerline axis 30 of the turbine engine 10. Alternative embodiments of the invention can include any number of shafts. The shafts 26, 28 can be journaled together for relative rotation. The shaft 26 can be a low pressure shaft supporting compressor blades 32 of a low pressure portion of the compressor section 16. The shaft 26 can also support low pressure turbine blades 34 of a low pressure portion of the turbine section 24.

The shaft 28 encircles the shaft 26. Bearings can be disposed between the shafts 26, 28. The shaft 28 can be a high pressure shaft supporting compressor blades 36 of a high pressure portion of the compressor section 16. The shaft 28 can also support high pressure turbine blades 38 of a high pressure portion of the turbine section 24.

FIG. 1 also shows compressor vanes 40 and 42 mounted upstream of the blades 32 and 36, respectively. The vanes 40, 42 are shown as radially cantilevered to simplify the schematic FIG. 1. The vanes 40, 42 are shown mounted at radially outer ends to a case 44. However, the vanes 40, 42 can be supported at both radial ends by inner and outer cases.

FIG. 1 also shows turbine vanes 46 and 48 mounted upstream of the blades 38 and 34, respectively. The vanes 46, 48 are shown as radially cantilevered to simplify the schematic FIG. 1. The vanes 46, 48 are shown mounted at radially outer ends to a case 50. However, the vanes 46, 48 can be supported at both radial ends by inner and outer cases.

Figure 2:
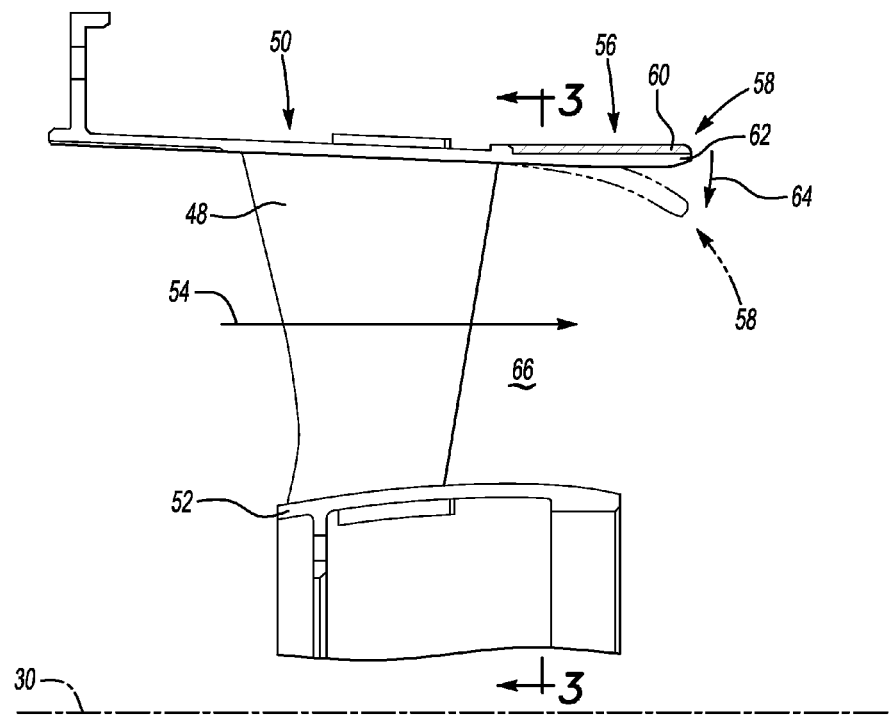
FIG. 2 is a cross-sectional detail view of a portion of the turbine engine shown schematically in FIG. 1.

FIG. 2 is a detail view of the first exemplary embodiment shown schematically in FIG. 1. The turbine vane 48 is shown extending between the outer case 50 and an inner case 52. The cases 50 and 52 define first and second spaced walls being opposite sides of a first fluid passageway 66 extending along a first axis 54. The case 50 includes a portion 56 cantilevered along the first axis 54. The portion 56 includes a distal end 58 moveable relative to the first axis 54 in response to changes in the flow temperature to vary a size of the fluid passageway 66. The vane 48 is a structural member extending radially relative to the centerline axis 30 and supports the distal end 58. In other embodiments of the invention, a structural member can be a strut.

The distal end 58 is passively moveable. The distal end 58 can be formed from two layers 60, 62 of material having different coefficients of thermal expansion. The coefficient of thermal expansion is the fractional change in length per degree of temperature change. By way of example and not limitation, the first or outer layer 60 can be Hastelloy X and have a coefficient of linear thermal expansion of about $9.1 \times 10^{-6}$ in/in/° F. The second or inner layer 62 can be titanium and have a coefficient of linear thermal expansion of about $5.3 \times 10^{-6}$ in/in/° F. The layers 60, 62 can be fixed together using any suitable method including but not limited to a welding, brazing, lamination, or a sintering process. It is noted that other materials and other combinations of materials can be applied in alternative embodiments of the invention.

In operation, as the temperature of the fluid flowing within the fluid passageway 66, the distal end 58 can move from the position shown in solid line in FIG. 2 to the position shown in phantom in FIG. 2. The distal end 58 can bend in the direction represented by arrow 64, moving radially inward. The flow area of the passageway 66 can change linearly as the flow temperature changes. The change in position of the distal end 58 can cause an increase in back pressure along at least part of the centerline axis 30. Further, the change in the passageway can change the mass flow rate of the core flow and increase engine efficiency under certain engine operating conditions. In addition, the increase in back pressure can result in an increase in the mass flow rate of secondary flows through the turbine engine 10 (shown in FIG. 1) since fluid flow can tend to be diverted from the core flow.

Figure 3:
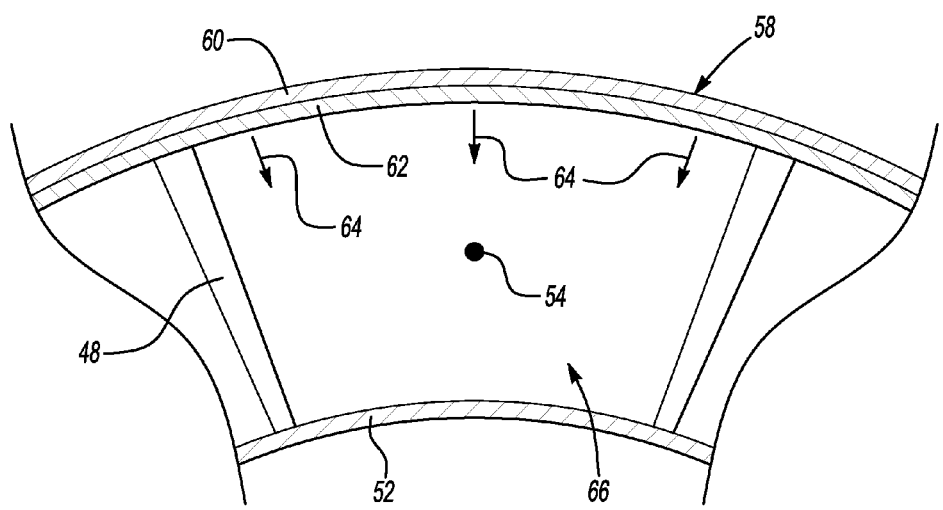
FIG. 3 is a partial cross-sectional view taken along section line 3-3 in FIG. 2.

The first and second walls defined by the cases 50, 52 can be arcuate in a plane containing the axis 54. FIG. 3 shows a cross-section through the cases 50, 52. The passageway 66 is shown positioned between the annular cases 50, 52. The cases can be fully or partially annular in alternative embodiments of the invention.

Referring again to FIG. 2, the exemplary layer 60 is positioned outside of the first fluid passageway 66. As a result, the size of the fluid passageway 66 decreases in response to increasing fluid temperature. In alternative embodiments of the invention, the layer 60 can be positioned inside the first fluid passageway 66, resulting in the size of the fluid passageway 66 increasing in response to increasing fluid temperature.

FIG. 4 shows a second exemplary embodiment of the invention. A turbine vane 48a can extend between an outer case 50a and an inner case 52a. The cases 50a and 52a can define first and second spaced walls being the opposite sides of a fluid passageway 66a extending along an axis 54a. The cases 50a and 52a can be spaced from one another radially relative to the centerline axis 30a. The case 50a defines a wall having a distal end 58a. The distal end 58a can be formed from two layers 60a, 62a of material having different coefficients of thermal expansion. In operation, as the temperature of the fluid flowing within the fluid passageway 66a increases, the distal end 58a can move in the direction represented by arrow 64a from the position shown in solid line in FIG. 4 to the position shown in phantom in FIG. 4.

The inner case 52a also defines a cantilevered wall having a distal end 68a formed from two layers 70a, 72a of material having different coefficients of thermal expansion. In operation, as the temperature of the fluid flowing within the fluid passageway 66a increases, the distal end 68a can move in the direction represented by arrow 74a from the position shown in solid line in FIG. 4 to the position shown in phantom in FIG. 4. The respective distal ends 58a and 68a can be individually moveable relative to the axis 54a in response to changes in the flow temperature to vary a size of the fluid passageway 66a. In the second exemplary embodiment, the distal ends 58a, 68a can move closer to one another in response to increasing flow temperature. However, in alternative embodiments, the distal ends 58a, 68a can move apart from one another in response to increasing flow temperature. In addition, the distal ends 58a, 68a can be formed from different combinations of materials so that the extent of deflection is different for each distal end 58a, 68a. Also, the distal ends 58a, 68a can be formed such that the distal ends 58a, 68a both move radially inward or both move radially outward in alternative embodiments of the invention.

FIG. 5 shows a third exemplary embodiment of the invention. A turbine vane 48b can extend between an outer case 50b and an inner case 52b. A wall 76b and the case 52b define first and second spaced walls being opposite sides of a fluid passageway 66b extending along an axis 54b. The wall 76b and the case 52b can be spaced from one another radially relative to the centerline axis 30b. The wall 76b includes a distal end 58b. The distal end 58b can be formed from two layers 60b, 62b of material having different coefficients of thermal expansion. In operation, as the temperature of the fluid flowing within the fluid passageway 66b increases, the distal end 58b can move in the direction represented by arrow 64b from the position shown in solid line in FIG. 5 to the position shown in phantom in FIG. 5.

The outer case 50b defines a third wall. The case 50b can be cantilevered to a distal end 78b having two layers 80a, 82a of material having different coefficients of thermal expansion. The case 50b and the wall 76b define opposite sides of a second fluid passageway 84b extending along a second axis 86b. In operation, as the temperature of the fluid flowing within the fluid passageway 84b increases, the distal end 78b can move in the direction represented by arrow 88*b* from the position shown in solid line in FIG. 5 to the position shown in phantom in FIG. 5.

The distal end 58*b* can be moveable relative to both of the axes 54*b* and 86*b* in response to changes in the flow temperature to inversely vary sizes of both of the first and second fluid passageways 66*b* and 84*b*. In other words, movement of the distal end 58*b* can cause the cross-sectional area of the passageway 66*b* to be reduced and cause the cross-sectional area of the passageway 84*b* to be increased.

The flow of fluid in the passageway 84*b* can accelerate the bending of the distal end 58*b*. For example, in the first embodiment shown in FIG. 2, heat from the fluid is transferred through the layer 62 before reaching the layer 60. In the third embodiment, the fluid can pass directly over the layer 60*b*.

In alternative embodiments of the invention, the case 50*b* can be formed with a distal end of a single layer, unlike the distal end 78*b*. In such an embodiment, the bending of the distal end 58*b* can result in diverting more fluid flow into the second fluid passageway 84*b* since back pressures in the first and second fluid passageways 66*b* and 84*b* would be inversely adjusted.

The respective distal ends 58*b* and 78*b* can be individually moveable relative to the axes 54*b* and 86*b* in response to changes in the flow temperature to vary the sizes of the fluid passageways 66*b* and 84*b*. In the third exemplary embodiment, the distal ends 58*b*, 78*b* can move generally in parallel to one another in response to increasing flow temperature. Thus, the cross-sectional area of the passageway 66*b* decreases and the cross-sectional area of the passageway 84*b* is generally unchanged. However, in alternative embodiments, the distal ends 58*b*, 78*b* can be formed to move away from one another in response to increasing flow temperature. In such an embodiment, the cross-sectional area of the passageway 66*b* can decrease and the cross-sectional area of the passageway 84*b* can increase. In addition, the distal ends 58*b*, 78*b* can be formed from different combinations of materials so that the extent of deflection is different for each distal end 58*b*, 78*b*.

It is noted that the embodiments described above have been associated with the turbine section of a turbine engine. However, the invention could be practiced in other areas of the turbine engine, such as the compressor section or in passageways for bypass flow. Further, embodiments of the invention could be applied in operating environments other than turbine engines.

Figure 6:
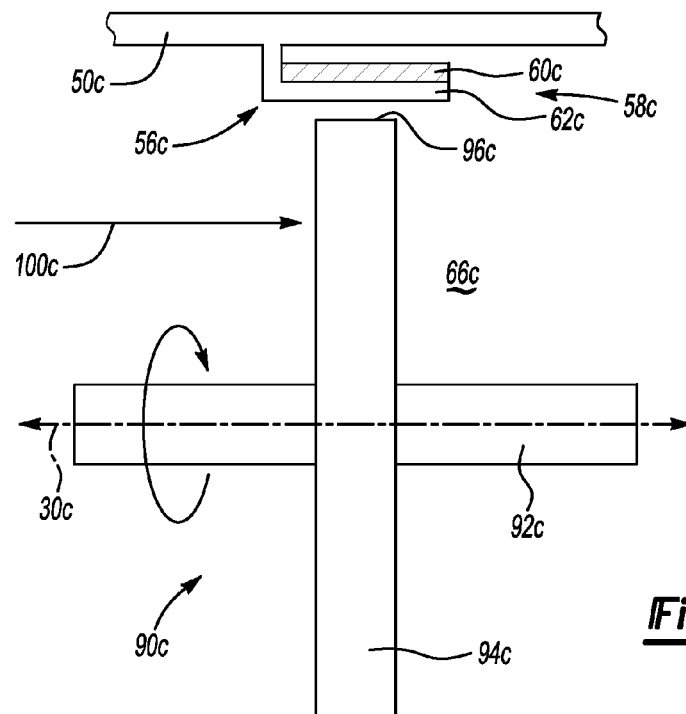
FIG. 6 is a cross-sectional detail view analogous to the view in FIG. 2 but of a fourth exemplary embodiment of the invention.

FIG. 6 shows a fourth embodiment of the invention. An outer case 50*c* can define a first wall of a fluid passageway 66*c* extending along an axis 30*c*. A structure 90*c* for converting energy associated with fluid into kinetic energy can be positioned in the fluid passageway 66*c*. The flow of fluid is referenced at arrow 100*c*. The structure 90*c* can include a shaft portion 92*c* operable to rotate about the axis 30*c*. The structure 90*c* can also include a bladed portion 94*c*. The bladed portion 94*c* is shown schematically and can be a blisk or a bladed disk assembly. The bladed portion 94*c* can be fixed to the shaft 92*c* for rotation. Blades of the bladed portion 94*c* can extend radially from the axis 30*c* to a radial outer end, such as a tip referenced at 96*c*. The fluid can pass across the blades of the bladed portion 94*c* and cause the structure 90*c* to rotate.

The outer case 50*c* can include a cantilevered portion 56*c* extending along the axis 30*c*. A distal end 58*c* of the cantilevered portion 56*c* can include layers 60*c*, 62*c* of material having different coefficients of thermal expansion. The distal end 58*c* can be moveable relative to the axis 30*c* in response to changes in the flow temperature to vary a size of the fluid passageway 66*c*.

The cantilevered portion 56*c* can cooperate with the blade tip 96*c* to form a seal. For example, it can be desirable to minimize the gap between the blade tip 96*c* and the cantilevered portion 56*c*. This will increase the amount of fluid flow over the blades of the portion 94*c* and thus the amount of energy extracted from the fluid flow.

The materials for the layers 60*c*, 62*c* as well as the physical dimensions of the layers 60*c*, 62*c* can be selected in view of controlling the size of the gap between the blade tips 96*c* and the cantilevered portion 56*c*. For example, as the temperature of the fluid moving in the passageway 66*c* increases, the distal end 58*c* can move closer to the axis 30*c* and reduce the size of the gap between the blade tip 96*c* and the cantilevered portion 56*c*. This will increase the efficiency of energy extraction from the fluid. Preferably, the materials and dimensions for the layers 60*c* and 62*c* can be selected so that cantilevered portion 56*c* does not contact the blade tip 96*c* during typical operation.

Sealing against a rotating body without contacting the rotating body is performed in operating environments such as turbine engines. By way of example and not limitation, it is known to allow for a run-in period consisting of several careful turbine engine accelerations so that abradable materials positioned on the radially inward surface of the seal can be rubbed out by the blade tips. This process can result in a relatively tight clearance during typical operation of the turbine engine. The cantilevered portion 56*c* can include an abradable portion in various embodiments to allow for a run-period as described above. The layer 62*c* can be partially abraded or another layer of material for being rubbed-out can be positioned on the layer 62*c*.

It is noted that a second wall can be defined on a side of the structure 90*c*, such as adjacent a blade tip referenced at 98*c*. The second wall can be a mirror image of the case 50*c* across the axis 30*c*, such that the second wall can include a cantilevered portion with a distal end radially moveable relative to the axis 30*c*.

Figure 7:
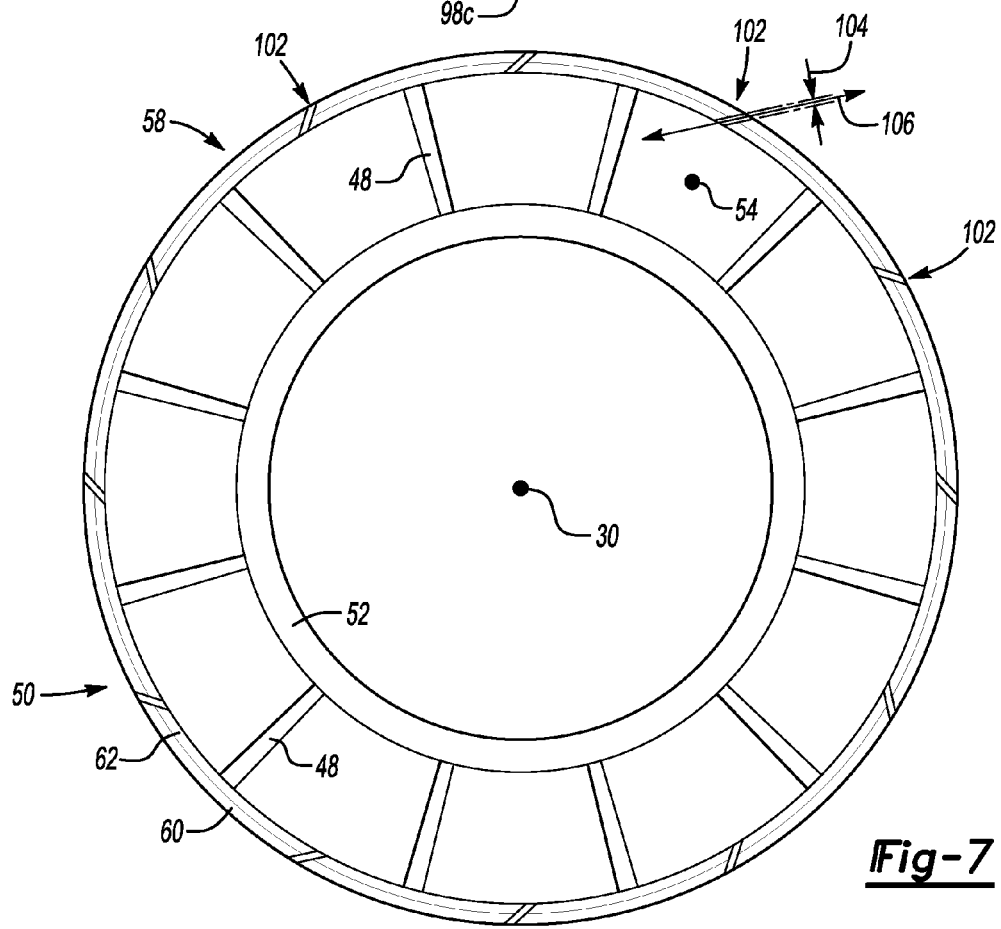
FIG. 7 is plan view from aft of the structures shown in FIG. 2 looking forward.

FIG. 7 is plan view from aft of the structures shown in FIG. 2 looking forward along the axis 30. The distal end 58 of the case 50 can include one or more slots 102. A plurality of slots is shown arranged around the periphery of the case 50. The slot 102 can extend through both layers 60, 62. The slot 102 can have a thickness referenced at 104. The thickness 104 is exaggerated and can be minimized in practice. The slot 102 can extend along an axis 106. The axis 106 can be transverse to and spaced from the axis 54. The slots 102 can effectively separate the distal end 58 into a plurality of sections and thereby allow the distal end 58 to more easily move toward the case 52.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims. The right to claim elements and/or sub-combinations of the combinations disclosed herein is hereby reserved.

What is claimed is:

1. An apparatus for controlling a fluid flow comprising:
first and second spaced walls defining opposite sides of a first fluid passageway extending along a first axis, wherein at least one of said first and second walls is cantilevered along said first axis and includes a distal end moveable relative to said first axis in response to changes in the flow temperature to passively vary a size of said first fluid passageway; and
at least one slot defined in said distal end, said at least one slot extending along a slot axis being transverse to and spaced from said first axis.

2. The apparatus of claim 1 wherein both of said first and second walls are arcuate in a plane containing said first axis and said first fluid passageway is at least partially annular.

3. The apparatus of claim 1 wherein both of said first and second walls are cantilevered with respective first and second distal ends that are individually moveable relative to said first axis in response to changes in the flow temperature to vary a size of said first fluid passageway.

4. The apparatus of claim 3 wherein said first and second distal ends move closer to one another in response to increasing flow temperature.

5. The apparatus of claim 1 wherein said at least one of said first and second walls further comprises:
a first layer having a first coefficient of thermal expansion; and
a second layer bonded to said first layer and having a second coefficient of thermal expansion greater than the first coefficient of thermal expansion.

6. The apparatus of claim 5 wherein said second layer is positioned outside of said first fluid passageway.

7. The apparatus of claim 5 wherein both of said first and second walls include respective first and second layers.

8. The apparatus of claim 7 wherein said second layer of said first wall and said second layer of said second wall are positioned outside of said first fluid passageway.

9. The apparatus of claim 1 wherein said first fluid passageway defines a flow area that is linearly related to the flow temperature.

10. The apparatus of claim 1 further comprising:
a third wall spaced from both of said first and second walls such that said third wall and one of said first and second walls define opposite sides of a second fluid passageway extending along a second axis.

11. The apparatus of claim 10 wherein said second wall is cantilevered and wherein said second and third walls define opposite sides of said second fluid passageway, said distal end of said second wall moveable relative to both of said first and second axes in response to changes in the flow temperature to inversely vary sizes of both of said first and second fluid passageways.

12. The apparatus of claim 1 further comprising:
a structure operable to extract energy from the flow of fluid in said first fluid passageway, wherein said at least one of said first and second walls is moveable relative to said first axis in response to changes in the flow temperature to seal against said structure.

13. A method for controlling a fluid flow comprising the steps of:
defining opposite sides of a first fluid passageway extending along an first axis with first and second spaced walls;
extending at least one of the first and second walls to be cantilevered along the first axis, wherein the at least one cantilevered wall includes a distal end moveable relative to the first axis in response to changes in the flow temperature to passively vary a size of the first fluid passageway; and
diverting more fluid flow into a second fluid passageway by passively and inversely adjusting the respective back pressures in the first and second fluid passageways.

14. The method of claim 13 further comprising the steps of:
forming the at least one cantilevered wall from a plurality of materials having different coefficients of thermal expansion such that the at least one cantilevered wall bends in response to changes in the temperature.

15. The method of claim 13 further comprising the steps of:
defining at least part of a second fluid passageway with the at least one cantilevered wall such that variations in the size of the first fluid passageway inversely vary the size of the second fluid passageway.

16. A turbine engine comprising:
first and second spaced walls defining opposite sides of a first fluid passageway extending along a first axis, wherein at least one of said first and second walls is cantilevered along said first axis and includes a distal end moveable relative to said first axis in response to changes in the flow temperature to passively vary a size of said first fluid passageway; and
a structure operable to extract energy from the flow of fluid in said first fluid passageway, wherein said at least one of said first and second walls is moveable relative to said first axis in response to changes in the flow temperature to seal against said structure.

17. The turbine engine of clam 16 further comprising:
a third wall radially spaced from said first and second walls relative to said centerline axis, wherein a second fluid passageway adjacent to said first fluid passageway is defined in part between said first and third walls.

* * * * *